(12) United States Patent
Mariano

(10) Patent No.: US 11,260,271 B2
(45) Date of Patent: *Mar. 1, 2022

(54) STRETCHABLE COVER FOR EXERCISE DEVICE AND/OR EQUIPMENT

(71) Applicant: Lisa B. Mariano, Bernardsville, NJ (US)

(72) Inventor: Lisa B. Mariano, Bernardsville, NJ (US)

(*) Notice: Subject to any disclaimer, the term of this patent is extended or adjusted under 35 U.S.C. 154(b) by 576 days.

This patent is subject to a terminal disclaimer.

(21) Appl. No.: 14/545,396

(22) Filed: Apr. 30, 2015

(65) Prior Publication Data

US 2016/0317897 A1 Nov. 3, 2016

(51) Int. Cl.
*A63B 71/00* (2006.01)
*B32B 3/30* (2006.01)
(Continued)

(52) U.S. Cl.
CPC ............ *A63B 26/003* (2013.01); *A63B 71/00* (2013.01); *B32B 3/085* (2013.01); *B32B 3/30* (2013.01);
(Continued)

(58) Field of Classification Search
CPC ........ A45C 13/002; A45C 3/001; A47G 9/06; D05B 3/12; A63B 71/0036; A63B 37/0023; A63B 2071/009; A63B 21/4037
(Continued)

(56) References Cited

U.S. PATENT DOCUMENTS

| 4,649,582 A * | 3/1987 | Cho ...................... A47G 9/0253 5/636 |
| 5,099,530 A | 3/1992 | Scott ................................ 5/420 |

(Continued)

FOREIGN PATENT DOCUMENTS

JP 2007/031922 2/2007 ............. A41B 11/00

OTHER PUBLICATIONS

"Slit." Merriam-Webster, Merriam-Webster, 2019, www.merriam-webster.com/dictionary/slit. (Year: 2019).*

(Continued)

*Primary Examiner* — Lee E Sanderson
*Assistant Examiner* — Michael C Romanowski
(74) *Attorney, Agent, or Firm* — Ernest D. Buff & Associates, LLC; Einest D. Buff

(57) ABSTRACT

A removable stretchable cover for exercise equipment has a first wall, a second wall, two side walls and two end walls arranged to form an interior cavity and an opening through which the exercise equipment is appointed to traverse. The opening is formed as a stretchable slit opening adapted to expand to engulf the exercise equipment, and contract in a closed configuration when the exercise equipment is housed within the interior cavity to substantially enclose the equipment within the cover. At least one anti-slip surface is integrated within at least one of the first wall, second wall, two side walls or two end walls. The cover is composed of a thin, stretchy, soft material so that it can be significantly stretched and contracted to snuggly fit over the exercise equipment. Examples of exercise equipment for which the cover is especially well suited include yoga blocks, foam rollers, exercise balls and arm handles of exercise machines.

4 Claims, 13 Drawing Sheets

(51) Int. Cl.

| | |
|---|---|
| *A63B 26/00* | (2006.01) |
| *B32B 5/08* | (2006.01) |
| *B32B 3/08* | (2006.01) |
| *B32B 5/26* | (2006.01) |
| *B32B 29/02* | (2006.01) |
| *A63B 21/00* | (2006.01) |
| *A63B 23/04* | (2006.01) |

(52) U.S. Cl.
CPC .................. *B32B 5/08* (2013.01); *B32B 5/26* (2013.01); *B32B 29/02* (2013.01); *A63B 21/4033* (2015.10); *A63B 21/4037* (2015.10); *A63B 23/0458* (2013.01); *A63B 71/0036* (2013.01); *A63B 2071/009* (2013.01); *A63B 2209/02* (2013.01); *B32B 2262/0215* (2013.01); *B32B 2262/062* (2013.01); *B32B 2262/14* (2013.01); *B32B 2272/00* (2013.01); *B32B 2307/51* (2013.01); *B32B 2307/744* (2013.01)

(58) Field of Classification Search
USPC ......... 428/148, 34.1; 297/228.1; 5/473, 487, 5/482, 485, 925, 490, 489, 738, 499; 206/579
See application file for complete search history.

(56) References Cited

U.S. PATENT DOCUMENTS

| | | | | |
|---|---|---|---|---|
| 5,642,540 A * | 7/1997 | Culver | .................. | A47C 21/06 297/228.1 |
| 5,727,266 A | 3/1998 | Pang | ................................. | 5/490 |
| 5,806,925 A * | 9/1998 | Hanley | ................ | A47C 31/113 297/219.1 |
| 6,065,164 A | 5/2000 | Swanger et al. | .................. | 5/420 |
| 6,067,677 A * | 5/2000 | Reen | .................... | A47G 9/0246 5/496 |
| 6,220,997 B1 * | 4/2001 | Kohl | ...................... | A63B 71/08 128/842 |
| 6,652,145 B2 * | 11/2003 | Valdez | .................... | A45C 3/08 190/108 |
| 6,751,816 B1 | 6/2004 | Wechsler | .......................... | 5/417 |
| 6,766,536 B1 | 7/2004 | Aarons | .......................... | 2/161.3 |
| 6,804,844 B2 * | 10/2004 | Cushing | ............... | A47G 9/0246 5/497 |
| 7,156,791 B2 | 1/2007 | Edwards | ....................... | 482/148 |
| 2004/0192523 A1 | 9/2004 | Wu | ................................ | 482/148 |
| 2004/0250348 A1 * | 12/2004 | Grimes | .................. | A61F 5/485 5/484 |
| 2005/0159279 A1 * | 7/2005 | Stangler | ................. | A63B 71/00 |
| 2007/0099779 A1 * | 5/2007 | Boehm | .............. | A63B 21/4017 482/148 |
| 2007/0219076 A1 | 9/2007 | Axelrod | ........................ | 482/148 |
| 2008/0178978 A1 | 7/2008 | Power | ........................... | 150/154 |
| 2008/0229500 A1 | 9/2008 | Lin | ................................. | 5/417 |
| 2009/0062093 A1 * | 3/2009 | Clark | ............... | A63B 21/00047 482/148 |
| 2009/0064412 A1 * | 3/2009 | Habimana | ............ | A47C 31/105 5/482 |
| 2011/0131723 A1 | 6/2011 | Andrews | .......................... | 5/417 |
| 2011/0265265 A1 * | 11/2011 | Roach | .................... | A47D 5/006 5/655 |
| 2012/0260421 A1 * | 10/2012 | DeGregorio | ....... | A47G 27/0206 5/417 |
| 2012/0317722 A1 * | 12/2012 | Pary | ....................... | A47D 5/003 5/485 |
| 2013/0178766 A1 | 7/2013 | Abdur-Raoof | .................. | 601/19 |
| 2014/0213421 A1 * | 7/2014 | Paris | .................. | A63B 21/0603 482/105 |
| 2014/0238560 A1 * | 8/2014 | Fair | ........................ | A45C 13/02 150/106 |
| 2015/0040427 A1 | 2/2015 | Sanders | ............................. | 36/44 |

OTHER PUBLICATIONS

"Elastic." Merriam-Webster, Merriam-Webster, www.merriam-webster.com/dictionary/elastic. (Year: 2021).*

Free Polymer Information. "Polymer Properties Database." Polyester Fibers, Crow, polymerdatabase.eom/Fibers/Polyester.html#:~:text-The%20majority%20of%20todays%20polyester,as%20strong%20as%20nylon%20fibers. (Year: 2021).*

Free Polymer Information. "Polymer Properties Database." Nylon Fibers, Crow, polymerdatabase.com/Fibers/Nylon.html. (Year: 2021).*

"Chip Foam Yoga Block Covers" found at http://www.yogamatstore.com/yoga-block-covers/.

"Yogamalai Block Cover" found at http://www.yogaunited.co.uk/yoga-block-cover.

"Carolina Morning Buckwheat yoga Block" found at http://www.exit15.com/carolina-morning-buckwheat-yoga-block.

* cited by examiner

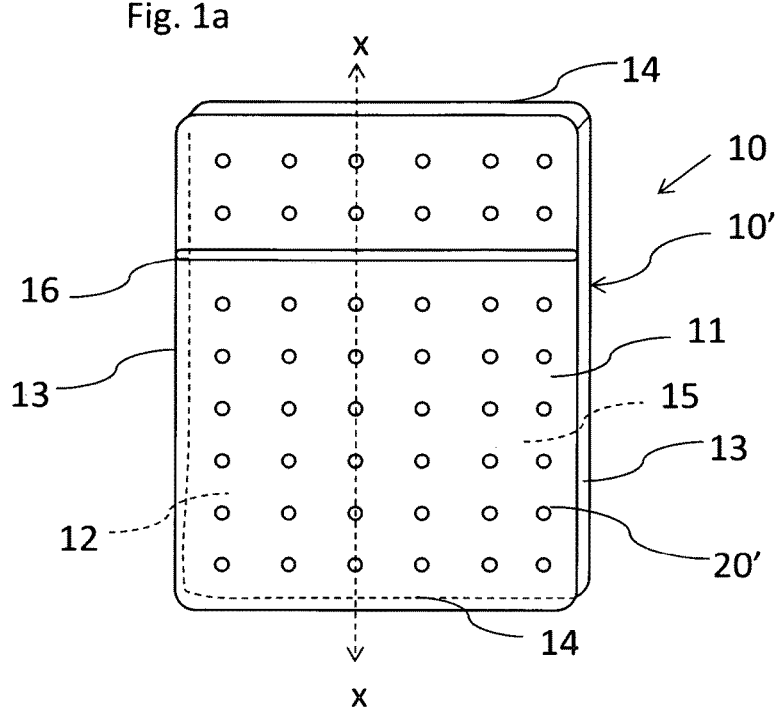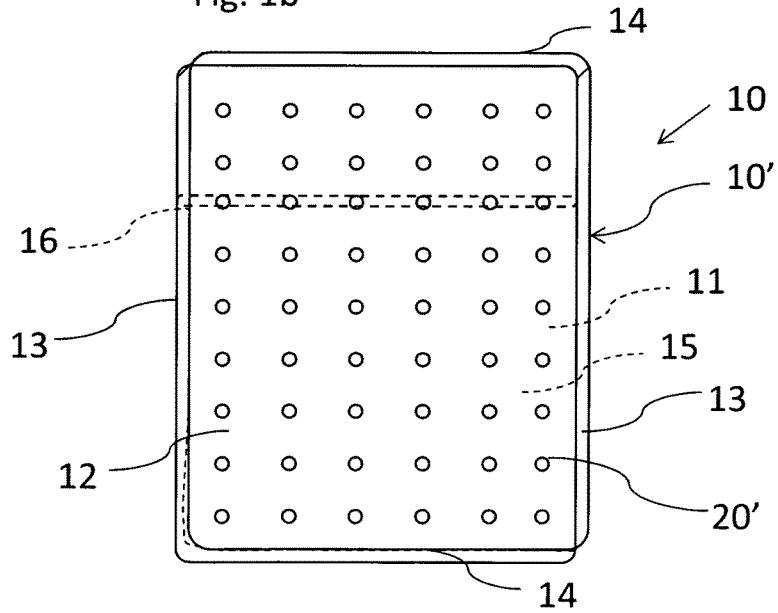

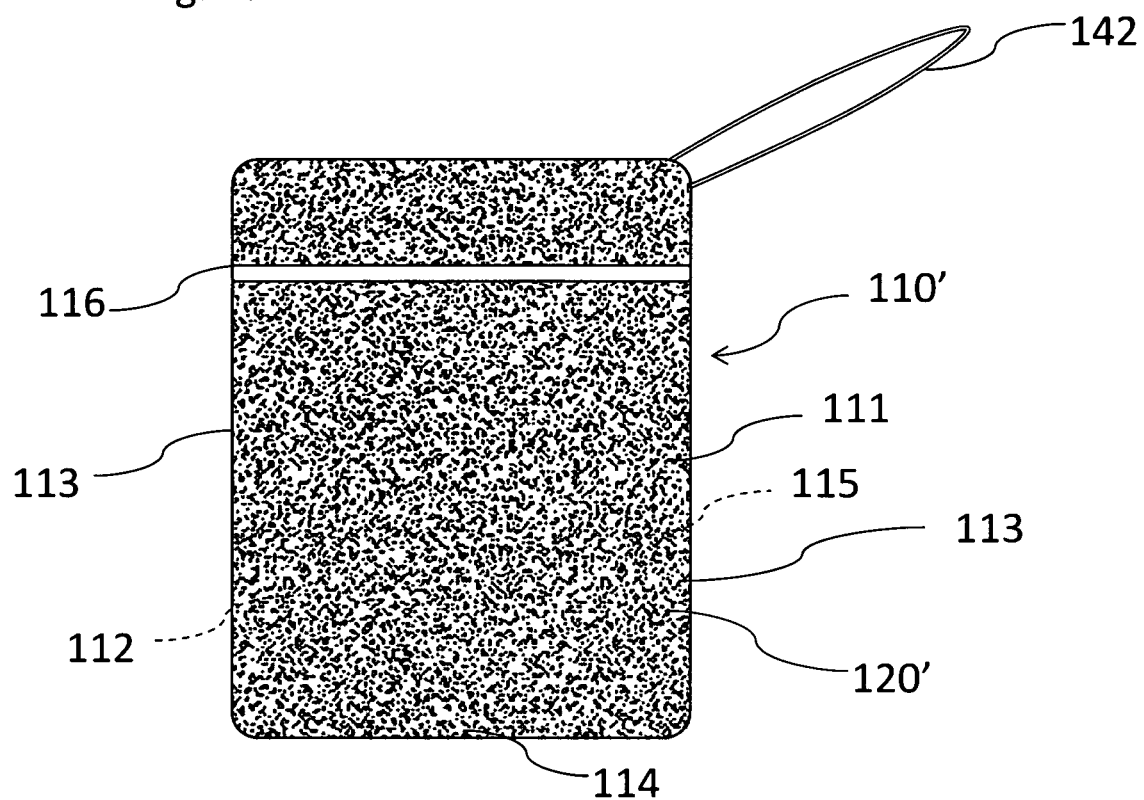

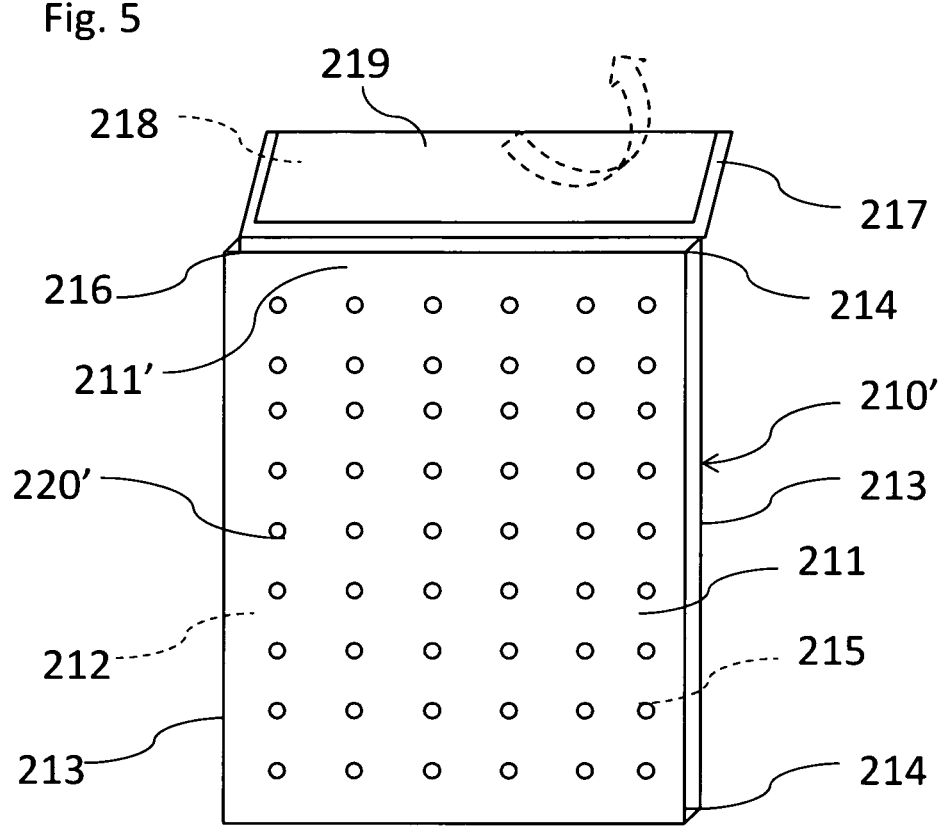

STRETCHABLE COVER FOR EXERCISE DEVICE AND/OR EQUIPMENT

FIELD OF THE INVENTION

The present invention relates to exercise equipment; and more particularly to a cover that encases at least a portion of the equipment to enhance functionality, mitigate the transmission of germs and facilitate a healthy, hygienic environment.

DESCRIPTION OF RELATED ART

Exercise equipment shared in a gym or club environment can become contaminated with germs, virus and sweat droplets from users. Particularly, such exercise equipment as elliptical trainers can involve upper body movement that requires bodily contact with components such as cylindrical handles. Likewise, some stair climbers, steppers and treadmills involve upper body contact with handles. These handles frequently become unsanitary, harboring germs and virus with repeated use.

Moreover, various exercise devices are repeatedly utilized in yoga classes. During these classes, yoga blocks, mats, and foam rollers come into direct contact with the user's body. Yoga blocks are blocks appointed to help an individual hold poses for increased amounts of time, providing space, length and comfort. These yoga blocks are also frequently utilized for therapeutic stretches and/or poses. Yoga blocks generally provide basic functions, including balance and increased flexibility. They help to maintain balance by providing support and comfort during longer yoga pose positions. Generally, yoga blocks are composed of wood, foam or cork materials. Wooden yoga blocks are often hollow and are made from bamboo, birch, maple, pine, balsa and poplar. Wood and bamboo yoga blocks provide excellent support, are very durable, and are environmentally friendly; however they are often heavy, uncomfortable to use, prone to becoming slippery when wetted with sweat, and tend to absorb sweat odors over time. Cork yoga blocks are generally lighter than wood blocks, and have been found to be durable, more comfortable than wood, good for extra grip/traction on smooth surfaces (such as wooden floors), environmentally friendly and absorb somewhat less sweat. Nevertheless, cork blocks tend to disintegrate over time and, although having porous properties that aid in absorbing sweat, they exhibit an absorptive rate that causes the blocks to become moist with sweat during use. Most yoga blocks are composed of various types of foam. Foam yoga blocks are lightweight, durable, comfortable, versatile and cost effective. They have the disadvantage of being less environmentally friendly than the wood and cork blocks and, like wood and cork blocks, also become unhygienic and unattractive owing to the absorption of sweat and body secretions over time.

Typical yoga blocks suffer from a variety of problems. During use, they become slippery with sweat; this causes the blocks to become less effective for their intended purpose, and to even become off-putting for the user. Owing to their construction, the blocks are not machine washable. Often yoga blocks are used time and again at yoga facilities or gyms without being disinfected. Such repeated usage in warm environments causes the blocks to become contaminated with germs, viruses and bacteria. This can be particularly dangerous and unhygienic, especially during the flu season.

Some examples of covers or devices heretofore disclosed and utilized in an attempt to make public exercise equipment more hygienic are set forth in summation below:

U.S. Pat. No. 5,099,530 to Scott discloses a washable fabric cover that fits over a folding exercise or rest mat or pad and can be folded with the pad inside into a compact package for carrying. The cover is a generally rectangular envelope having a head portion and a foot portion. It is enclosed at the end of the head portion and along its opposed longitudinal sides, remaining open at the end of the foot portion to form a top layer and a bottom layer of material. A pocket on the top layer at the head portion removably receives a pillow or other articles. A length of material extends outwardly from the open end to be folded over and substantially cover the top layer. This length of material serves as a blanket to cover a person laying on the covered pad; and can be folded and received within the open end in a stored condition. A pair of flexible loops is secured to the bottom layer to form carrying straps when the cover and the enclosed pad is in the compact package for carrying. The cover with the enclosed pad is a foldable accordion style such that the pocket is disposed on an outer side of the folded configuration or can be folded inwardly upon itself from each end such that the pocket is disposed on the inside of the folded configuration. Alternatively, the sheet portion may be removable and a second pocket may be provided on the bottom layer at the foot portion for storing the sheet portion or other articles.

U.S. Pat. No. 5,727,266 to Pang discloses a disposable pillow or cushion cover formed by an envelope of air and moisture impermeable material. The envelope encases the pillow or cushion and provides an impermeable resting surface upon which a user may rest the head or other body part on a clean, comfortable, fresh, hygienic, fragrant resting surface without having to change pillows, cushion covers or envelopes. The envelope contains a vent to permit ingress and egress of air from the pillow or cushion. The envelope also includes a sealable opening to permit insertion and removal of the pillow or cushion. A facing layer of air permeable material extends over the resting surface and is secured to the envelope at spaced apart locations to allow air flow and a degree of relative movement between the facing layer and envelope.

U.S. Pat. No. 6,065,164 to Swanger, et al. discloses a removable nap mat cover that is made of two fabric panels and has one end closed with an end fastener. The nap mat slips between the fabric panels. The end fastener secures the fabric panels together for about ⅔ of their width defining openings large enough for a person's hand to fit through. The end fastener prevents the nap mat cover from coming off the mat. The end fastener may be a hook and loop fastener.

U.S. Pat. No. 6,751,816 to Wechsler discloses an exercise mat ensemble for use in exercise disciplines such as yoga that involve floor exercises and positions. A vinyl padded sticky mat is covered with a sheet of washable absorbent fabric that overlays the sticky mat on all four sides. The fabric sheet may be extended at one transverse end with sufficient fabric that when folded over more than once it forms a cushion to aid in certain exercises and positions. When the fabric sheet is placed on top of the mat and the two are rolled together, the fabric extension encloses the mat within the roll. The extension may also be stitched to form an envelope or stitched on each side to form channels into which drawstrings are placed, both capable of forming a case around the rolled mat and fabric sheet. A strap may be added to the ensemble to assist in certain exercises and positions and also to be incorporated into the rolled mat and fabric sheet for use as a carrying strap. The fabric extension may also be separate from the main fabric sheet to increase the number of fold possibilities, to provide added assistance for specific exercises and positions, and to serve as a meditation blanket. A sheath may be used to cushion the strap for ease of carrying.

U.S. Pat. No. 6,766,536 to Aarons discloses a yoga support system including a pair of yoga gloves and a pair of yoga slippers. Yoga gloves cover the hands of a yoga practitioner and include anti-skid material on parts of the gloves to enable a yoga practitioner to attain and maintain postures that involve pressing on a floor or wall. In particular, the yoga gloves may include anti-skid portions covering an outer part (further from the midline of the hand) of the yoga practitioner's thumb. The yoga slippers include an anti-skid sole, as well as anti-skid side portions on their sides. The slippers allow a yoga practitioner to maintain floor contact, with the feet flat on the floor, or with the feet pronated or supinated. Other parts of the yoga gloves and yoga slippers are uncovered fabric, which may be a light, breathable and stretchable material.

U.S. Pat. No. 7,156,791 to Edwards discloses yoga grip blocks having one or more block sections and a grip section that provide support and comfort in the practice of yoga exercises.

U.S. Patent App. Pub. No. 20040192523 to Wu discloses a brick for yoga exercising including a hollow core brick made of plastics and a softwood outer layer covering an outer overall surface of the hollow core brick. The hollow core brick is a hollow brick of a predetermined shape with rugged engaging faces on the outer overall surface thereof. The softwood outer layer is bonded to the rugged engaging faces of the hollow brick core. The hollow core brick provides improved support for the weight of the yoga exerciser, while the softwood outer layer provides improved anti-slip effect and comfortable touch.

U.S. Patent App. Pub. No. 20070219076 to Axelrod discloses a yoga block having two identical sections which disassemble to form two yoga wedges. The two yoga wedges are held together in block form by a cylinder passing through both wedges when the wedges are aligned into the yoga block form.

U.S. Patent App. Pub. No. 20080229500 to Lin discloses a foam pad including a base made by foam material. A reinforcement layer is attached to a top of the base and can be made by fabric; and a cork layer is attached to a top of the reinforcement layer. The cork layer provides a better ventilation feature so as to absorb the user's sweat and provide a dry surface. The foam pad can be easily rolled up.

U.S. Patent App. Pub. No. 20090062093 to Clark discloses a beanbag yoga block comprised of a sewn cover and firmly filled with loose flowing, pellet-like material. This new construction method provides the essential effects of a rigid block or brick, with the added benefits a soft yoga block provides. The dimensions of the invention do not vary widely from 4 inches (height) by 6 inches (width) by 9 inches (length), which are the predetermined dimensions of traditional (prior art) yoga blocks and which allow the full functioning of the beanbag yoga block for its intended purposes. The beanbag yoga block is said to serve all the requirements of traditional yoga blocks, but additionally provides the following advantages: economical, environmentally-friendly, wider market appeal, versatility of use, versatility of design, ease and comfort of use, and domestically produced materials which generate more revenue for the economy U.S. Patent App. Pub. No. 20110131723 to Andrews discloses a combined yoga exercise mat and yoga exercise strap that are movable to: (a) a hanging position in which the yoga exercise strap is attached to the yoga exercise mat to facilitate hanging the yoga exercise mat for washing, air drying and storage, (b) a carrying position in which the yoga exercise mat is rolled and the yoga exercise strap is positioned about and secures the rolled yoga exercise mat and in which the yoga exercise strap can be positioned on a shoulder of a person to help carry the rolled yoga exercise mat, and (c) an exercise position in which the yoga exercise strap is detached from the yoga exercise mat so that a person can perform yoga exercises with the yoga exercise strap and on the yoga exercise mat.

U.S. Patent App. Pub. No. 20120260421 to Degregorio discloses a cover for a yoga mat. The cover has a top surface for contacting a user and a bottom surface for contacting a floor. The top and bottom surface enclose a piece of yoga equipment. The yoga mat cover may be designed to absorb sweat, prevent the spread of germs, and be machine washable.

Foreign Patent App. Pub. No. JP2007031922 to Nishi discloses an antislip set for preventing the slip of hand and foot in fixing a pose in yoga and stretch exercise, enabling easy grip and quickening the progress by self-study.

Non Patent Literature entitled "*Chip Foam Yoga Block Cover*" found at http://www.shophalfmoon.com/Chip_Foam_Yoga_Block_COVER_p/13473.htm discloses a chip foam yoga block cover to protect a chip foam block from wear, grime, perspiration, and ultraviolet rays. It's also easy to remove and toss in the wash.

Non Patent Literature entitled "*Yogamalai Block Cover*" found at http://www.yogaunited.co.uk/yoga-block-cover discloses yoga block covers with zip fastening for a better fit.

Non Patent Literature entitled "*Yoga Block Covers*" found at http://www.yogamatstore.com/yoga-block-covers/discloses washable 100% cotton yoga block covers to help preserve yoga blocks while adding a soft feel. The yoga block is slipped into the cover and zipped therein.

Non Patent Literature entitled "*Carolina Morning Buckwheat Yoga Block*" found at http://www.exit15.com/carolina-morningbuckwheatyogablock?language+en ¤cy=USD&gclid=CKCO-eHujMQCFRYkgQodeTAAnQ discloses yoga blocks with zippered removable covers.

Though various covers for exercise devices and equipment, such as yoga blocks, mats and rolls, have been provided in the art, these covers encounter several disadvantages. Specifically, covers can cause the yoga blocks, or devices, to become unstable during use owing to sliding of the cover on the floor and/or bunching-up of cover material during use. Another disadvantage with such covers is their tendency to absorb microbes and thereby become unhygienic during use. It is an object of the present disclosure to obviate the aforesaid disadvantages and to provide a yoga cover or exercise device cover that is easy to secure on a yoga mat or roller while also providing a non-slip surface and enhanced microbial properties conducive to an enhanced hygienic environment.

SUMMARY OF THE INVENTION

The present invention provides a removable, stretchable cover for exercise equipment. The removable cover is suitable for exercise blocks, and specifically for yoga blocks, as well as for foam rollers, exercise balls, mats and handles of exercise machines. The subject cover provides a barrier against bacteria and germs. It can be composed of antimicrobial/antibacterial material, such as copper or silver threading, or the like. The cover is constructed of thin, stretchy, soft material that fits snuggly around a yoga block to provide an anti-slip surface that enables the yoga practitioner to obtain a better grip, even in warm, humid environments. Materials the cover is made from, include, but are not limited to, recyclable or recycled materials, absorptive materials, disposable fibrous materials (i.e. cottons, cellular material, paper), natural fibers, synthetics such as Spandex/Lycra or similar material and/or combinations thereof. Preferably, the cover is composed of a material having antimicrobial/antibacterial properties including a material with an antimicrobial/antibacterial coating or having an antimicrobial/antibacterial substance integrated within the fibers of the material making up the cover. Antimicrobial/antibacterial substances include, but are not limited to, a copper or silver micro coating and/or fiber integration, including copper or silver threading to ensure antimicrobial properties even at the cover seams. It is amenable to a variety of unique designs and patterns, and can be individualized to fit the taste of the user. The stretchy material can be made in a single size that will likely fit many yoga block sizes and shapes. A zippered, mesh bag can be provided to prevent loss of the stretchable cover during machine washing operations.

In a first broad embodiment the subject cover has a first, second, two side and two end walls arranged to form an interior cavity including an opening through which the exercise equipment is appointed to traverse. The opening is formed as a stretchable slit opening adapted to expand to engulf the exercise equipment, and contract in a closed configuration when the exercise equipment is housed within the interior cavity to substantially enclose the equipment within the cover. At least one anti-slip surface is integrated within at least one of the first wall, second wall, two side walls or two end walls. The cover is composed of a thin, stretchy, soft material so that it can be significantly stretched and contracted to snuggly fit over the exercise equipment. Exercise equipment includes yoga blocks, foam rollers, exercise balls and handles of arm components of exercise machines.

Other embodiments include variations depending from the aforementioned broad embodiment. For example, the opening may be located on either the first wall or the second wall, one of the side walls, or on one of the end walls. The opening may include a covering flap having fastening means for securing the flap in a closed configuration. Further, the opening may include fastening means for completely closing the opening. Preferably, the opening is formed as an elongated narrow slit. The anti-slip surface may be integrated within one of the first wall or the second wall, first wall and the second wall, or within at least one of the side walls. Alternatively, the anti-slip surface is integrated within the side walls and/or at least one of the end walls. Preferably, the anti-slip surface is integrated within the first, second, side and end walls so that substantially the entire surface area of the cover includes the anti-slip surface. In a preferred embodiment, the anti-slip surface is comprised of a plurality of raised portions. Most preferably, the anti-slip surface is comprised of a plurality of dot formed as small up-raised structures composed of a friction inducing material, such as rubber, a polymeric material, a silicon, or other frictional substance so that the cover does not slide on smooth surfaces, such as hardwood or laminate floors.

Preferably, the cover is composed of a material having antimicrobial/antibacterial properties including a material with an antimicrobial/antibacterial coating or having an antimicrobial/antibacterial substance integrated within the fibers of the material making up the cover. Antimicrobial/antibacterial substances include, but are not limited to, a copper or silver micro coating and/or fiber integration, including copper or silver threading to ensure antimicrobial properties even at the cover seams. In another embodiment, at least one wall, either the first wall or second wall or both, includes an absorptive cloth layer, such as cotton, or terry cloth. The cover is preferably composed of an elastic material, such as spandex, Lycra, nylon, or similar elastic materials. A mesh carry bag may be provided for carrying and housing the cover when not in use. Also, a yoga strap may be provided.

In another embodiment, a removable cover for exercise devices, comprises: a) a stretchable cover having a first wall, a second wall, two side walls and two end walls arranged to form an interior cavity; b) the interior cavity including an opening through which an exercise device is appointed to traverse for receiving and temporarily housing the exercise device within the cavity; c) the opening being formed as a slit and being a stretchable opening formed as an elongated narrow slit adapted to expand to engulf the exercise device when being inserted, and contract in a closed configuration when the exercise device is housed within the interior cavity, wherein the opening substantially closes over the exercise device so that it is substantially completely enclosed within the cover; d) at least one absorbent surface being integrated within at least one of the first wall, second wall, two side walls or two end walls; and e) the cover being composed of a thin, stretchy, soft material so that it can be significantly stretched and contracted to snuggly fit and cover the exercise device. Preferably, the cover is formed as an elongated tube sleeve and the exercise equipment is a foam roller. Alternatively, the cover is formed as a circle and the exercise equipment is an exercise ball. In another embodiment, the cover is formed as a truncated tube sleeve and the exercise equipment is an arm handle of an exercise machine.

BRIEF DESCRIPTION OF THE DRAWINGS

The advantages and features of the present disclosure will become better understood with reference to the detailed description taken in conjunction with the accompanying drawings, wherein like elements are identified with like symbols, and in which:

FIG. 1a illustrates a front top plan view of an embodiment of the stretchable cover;

FIG. 1b illustrates a back top plan view of the embodiment shown in FIG. 1a;

FIG. 1c illustrates a view of a side wall of the embodiment shown in FIG. 1a;

FIG. 1d illustrates a view of an end wall of the embodiment shown in FIG. 1a;

FIG. 1e illustrates a cross-sectional view taken at x-x in FIG. 1a;

FIG. 4a shows a top plan view of another embodiment of the cover when not in use;

FIG. 5 illustrates a top plan view of another embodiment of the cover wherein the cover is disposable and includes a tab covering an adhesive;

DETAILED DESCRIPTION OF THE DISCLOSURE

The best mode for carrying out the present disclosure is presented in terms of the embodiment, herein depicted in the Figures. The embodiment(s) are described herein in detail for illustrative purposes and may be subject to many variations. It is understood that various omissions and substitutions of equivalents are contemplated as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. Any headings utilized within the description are for convenience only and have no legal or limiting effect.

The terms "a" and "an" herein do not denote a limitation of quantity, but rather denote the presence of at least one of the referenced item.

The subject stretchable cover provides a barrier against bacteria and germs. It can be composed of antimicrobial/antibacterial material, such as copper or silver threading, etc. In addition, it is constructed of thin, stretchy, soft material that fits snuggly around the yoga block to provide an anti-slip surface that provides a better grip, even in warm, humid environments. The stretchable cover is made from recyclable or recycled materials, and can be made from Spandex/Lycra or similar material. It is amenable to a variety of unique designs and patterns, and can be individualized to fit the taste of the user. The stretchy material can be made in a single size that will likely fit many yoga block sizes and shapes. A zippered, mesh bag can be provided to prevent loss of the stretchable cover during machine washing operations.

Figure 1C:
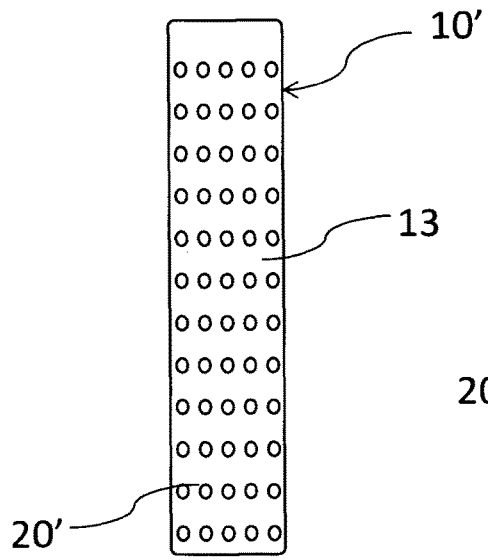
Figure 1D:
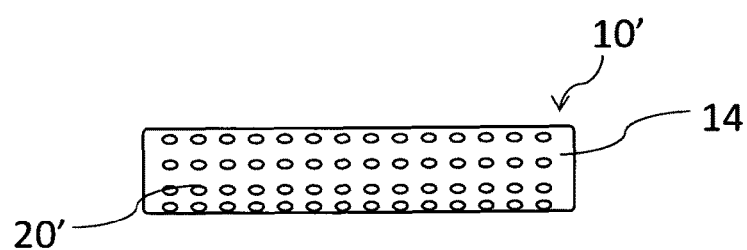
Figure 1E:
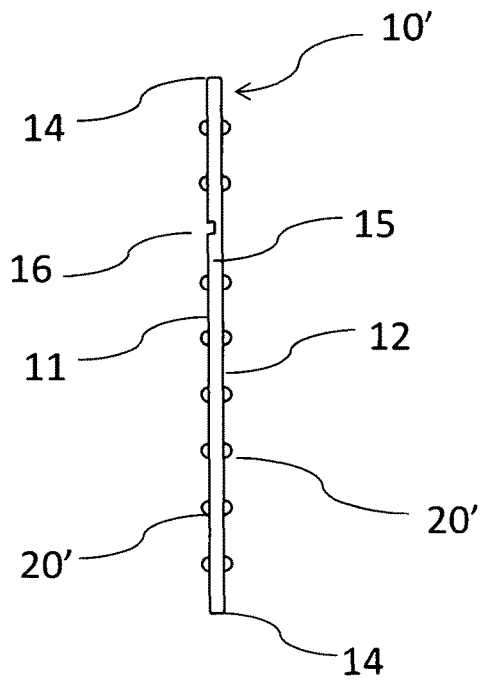
Figure 2A:
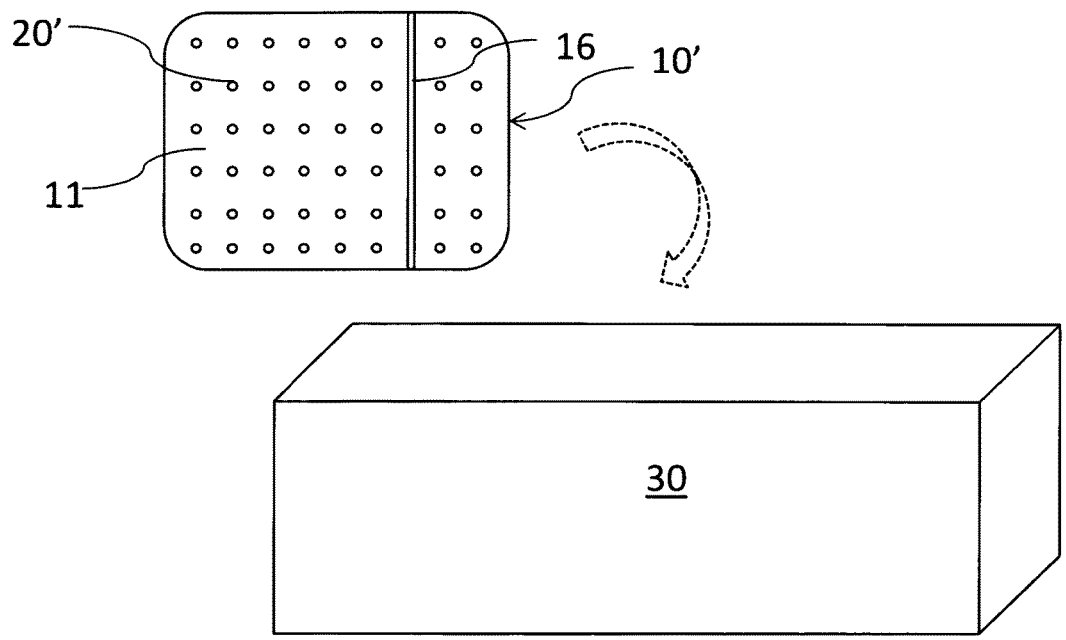
FIG. 2a illustrates a top plan view of the embodiment of FIG. 1a-1e wherein the cover is ready to be placed on a yoga block.
Figure 2B:
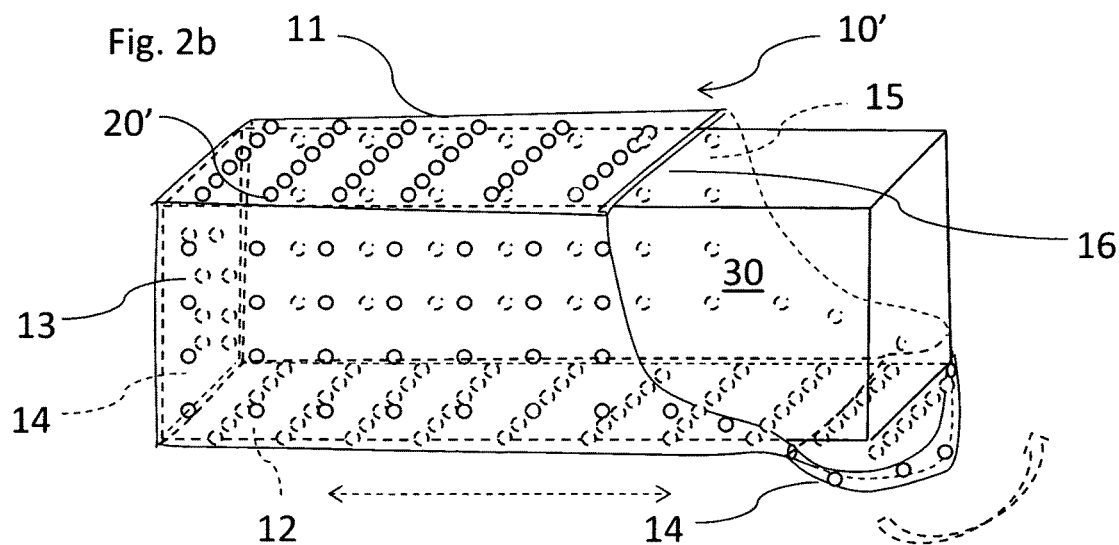
FIG. 2b shows the cover being stretched while the yoga block is being placed therein.
Figure 2C:
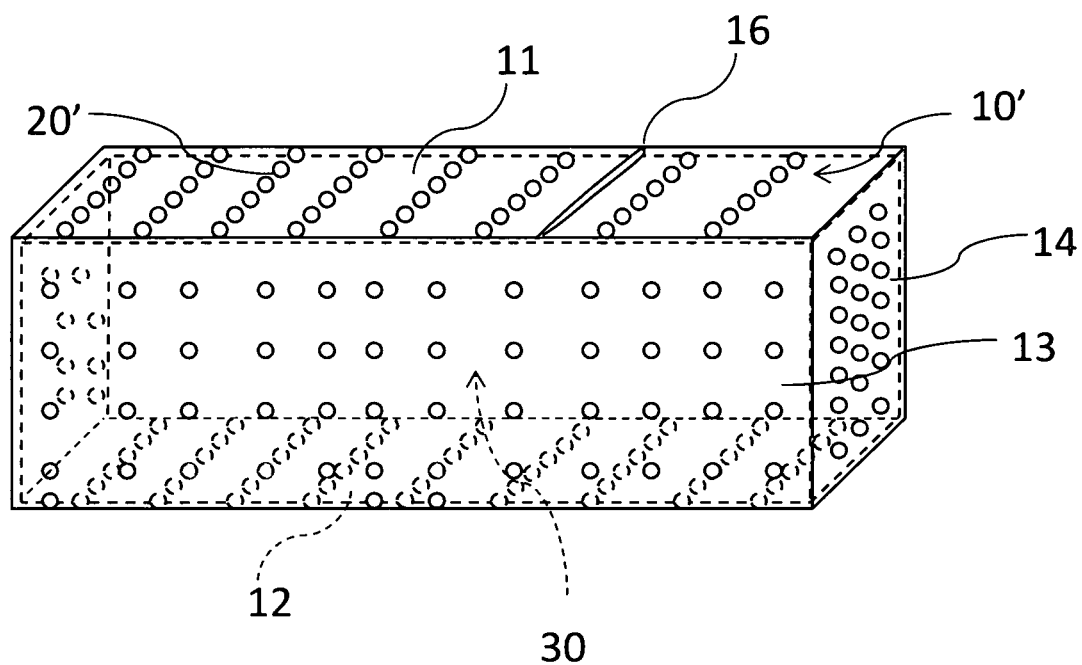
FIG. 2c shows the yoga block housed within the cover.
Figure 3:
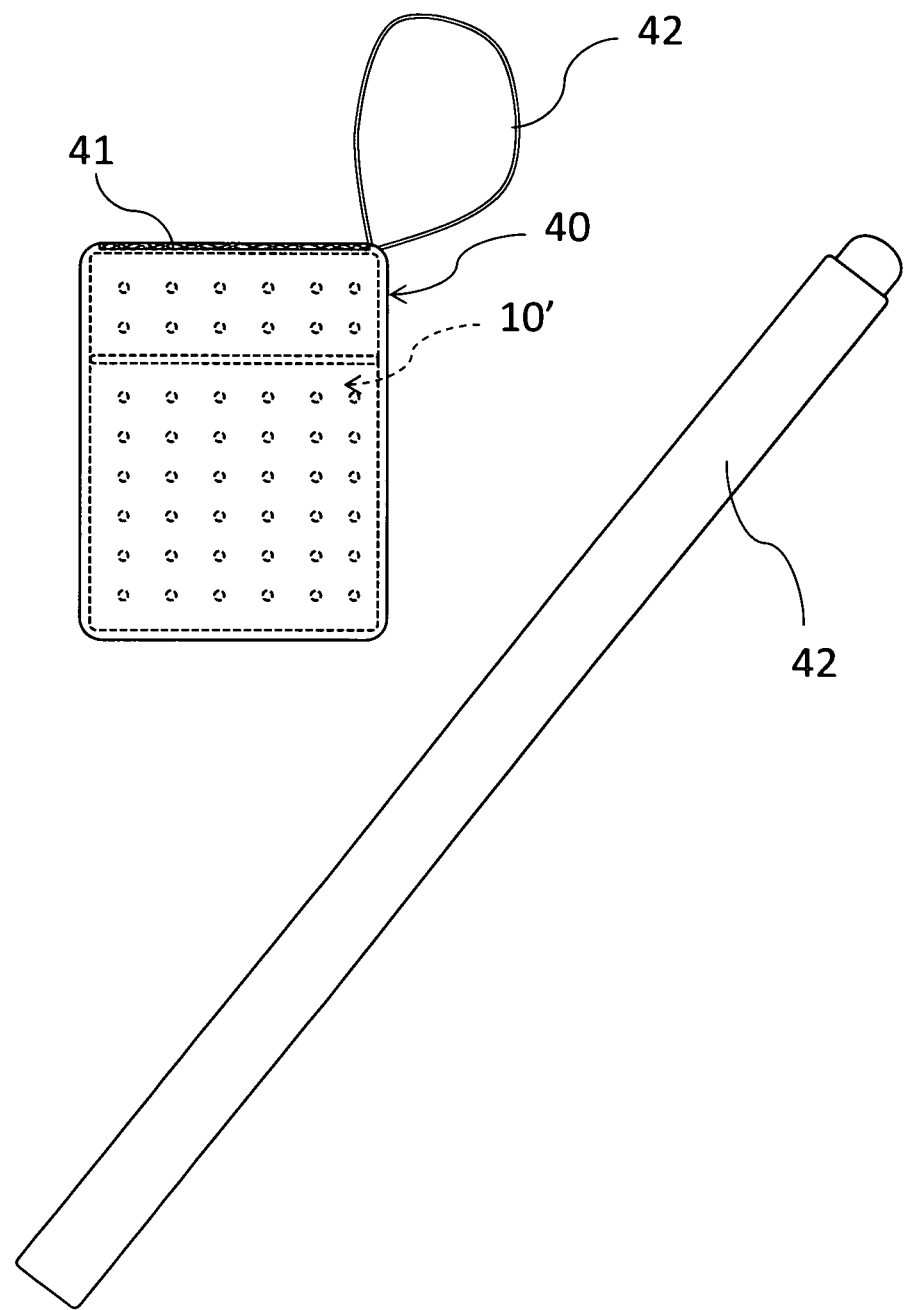
FIG. 3 illustrates a top plan view of an embodiment wherein the stretchable cover is provided with a pouch and an alternative yoga strap.
Figure 4B:
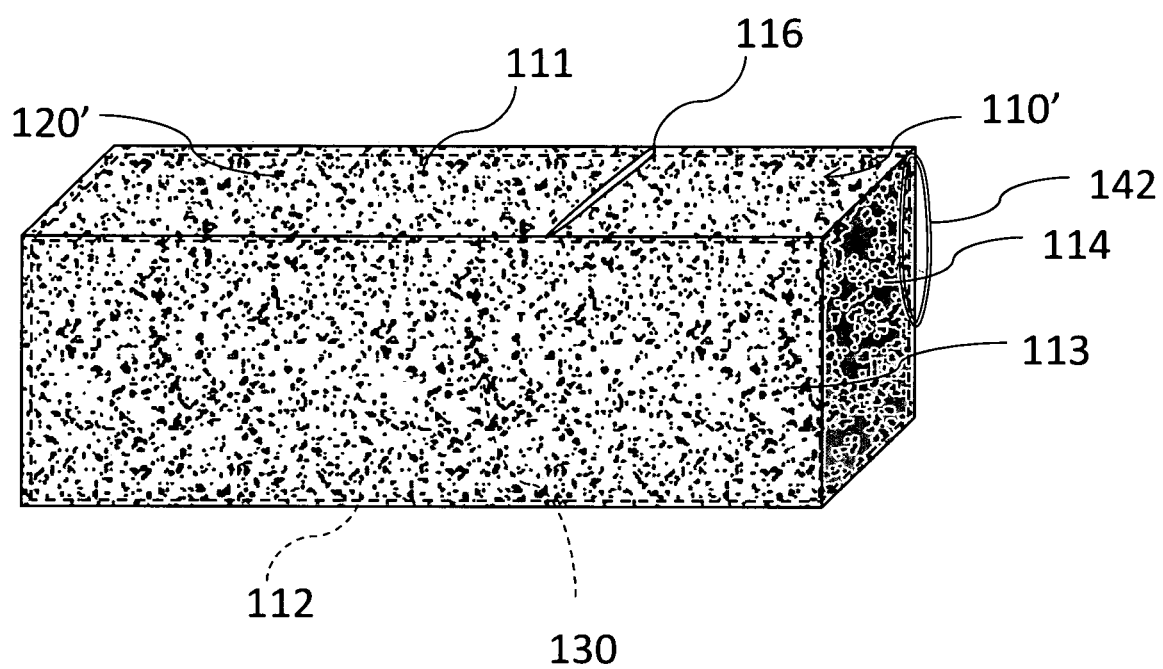
FIG. 4b shows the cover stretched to accommodate and house a yoga block.
Figure 6:
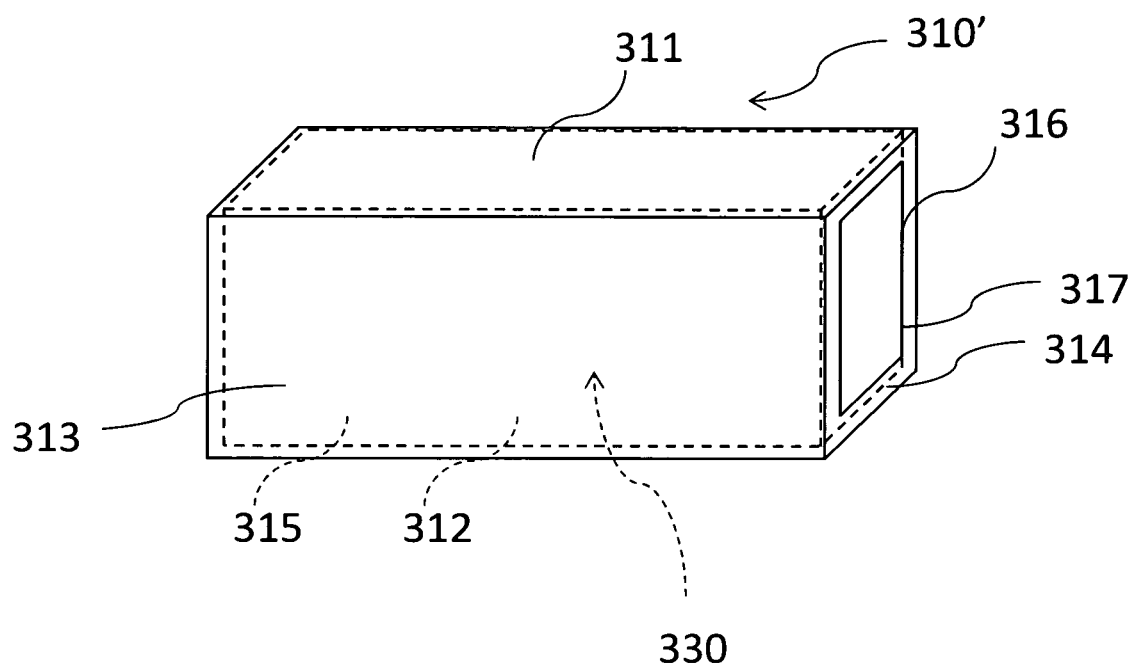
FIG. 6 illustrates a top plan view of another embodiment of the stretchable cover wherein the cover opening is located on an end wall and the opening includes an elastic band therein.
Figure 7:
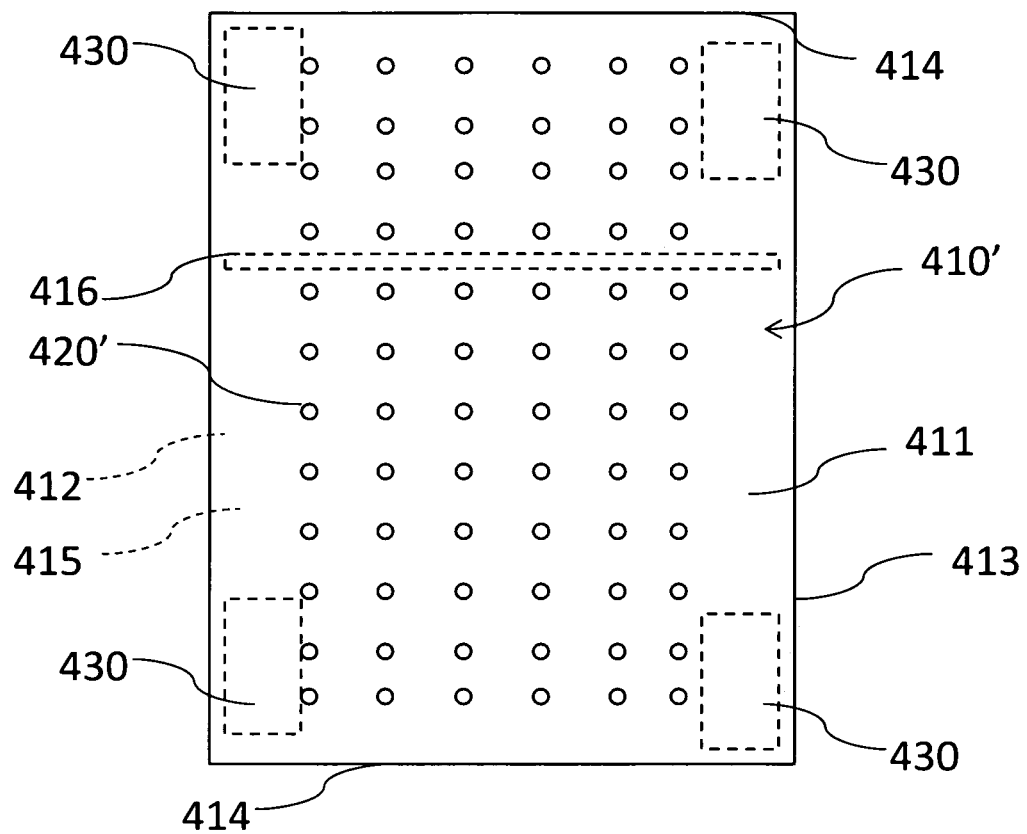
FIG. 7 illustrates a top plan view of an embodiment of the stretchable cover applied to form a mat with yoga blocks placed therein.

A yoga block cover is provided by way of the subject invention. FIGS. 1a-1e illustrate an embodiment of the cover. Specifically, FIG. 1a illustrates a front top plan view; FIG. 1b illustrates a back top plan view; FIG. 1c illustrates a view of a side wall; FIG. 1d illustrates a view of an end wall; and FIG. 1e illustrates a cross-sectional view taken at x-x in FIG. 1a. FIGS. 2a-2c illustrate application of the embodiment of FIGS. 1a-1e on a yoga block. Particularly, FIG. 2a illustrates a top plan view of the embodiment of FIG. 1a-1e wherein the cover is ready to be placed on a yoga block; FIG. 2b shows the cover being stretched while the yoga block is being placed therein; and FIG. 2c shows the yoga block housed within the cover. FIG. 3 illustrates an embodiment wherein the stretchable cover is provided with a pouch and an alternative yoga strap. FIGS. 4a-4b illustrate another embodiment of the stretchable cover wherein the material used to form the cover includes anti-slip or frictional surface elements. FIG. 4a shows the cover when not in use; FIG. 4b shows the cover stretched to accommodate and house a yoga block. FIG. 5 illustrates another embodiment of the cover wherein the cover is disposable and includes a tab covering an adhesive. FIG. 6 illustrates another embodiment of the stretchable cover wherein the cover opening is located on an end wall and the opening includes an elastic band therein. Lastly, FIG. 7 illustrates an embodiment of the stretchable cover applied to form a mat with yoga blocks placed therein.

Referring to FIGS. 1a-1e, 2a-2c and FIG. 3, an embodiment of the stretchable cover is shown generally at 10, comprising a cover 10' having a first wall 11, a second wall 12, two side walls 13 and two end walls 14 arranged to form an interior cavity 15. Interior cavity 15 includes an opening 16 through which an exercise block or yoga block 30 is appointed to traverse for receiving and temporarily housing yoga block 30 within cavity 15. Opening 16 is located on first wall 11 and is formed as a slit or stretchable opening expanding to engulf yoga block 30 when the block is being inserted, and contracting in a closed configuration when yoga block 30 is housed within the interior cavity 15. Cover 10' includes at least one anti-slip surface integrated within first wall 11, second wall 12, the two side walls 13 or the two end walls 14. Herein, an anti-slip surface is integrated within first wall 11, second wall 12, the two side walls 13 and the two end walls 14, herein shown as a plurality of dots 20'. Dots 20' are preferably composed as small up-raised dot structures composed of a friction inducing material, such as rubber, a polymeric material, a silicon, or other frictional substance so that the cover 10' with block 30 therein does not slide on smooth surfaces, such as hardwood or laminate floors. Cover 10' is a compact cover that stretches to cover a yoga block providing sanitary, aesthetic, comfort, sweat absorption and anti-slip functions, protecting a user from germs, bacteria, sweat and viruses. Cover 10' is machine washable, and is preferably composed of an antimicrobial/antibacterial material with copper or silver threading to ensure antimicrobial properties even at seams of the cover. Antimicrobial textile treatment that durably binds effective antimicrobial ingredients to textiles that inhibit the growth of bacteria on and in the fabric may be utilized in making the cover 10'. In an alternative embodiment, at least one wall, either the first wall 11 or second wall 12 or both, includes an absorptive cloth layer, such as cotton, or terry cloth.

Cover 10' is composed of a thin, stretchy, soft material so that it can be stretched to snuggly fit and cover yoga blocks 30 having a variety of sizes and shapes. Preferably, cover 10' is made from recycled materials, and material having significant elasticity so that it is a small non-cumbersome cover when not in use as illustrated in FIG. 2a capable of stretching to cover and accommodate yoga blocks 30 of all standard block sizes, as illustrated in FIGS. 2b and 2c. Cover 10' materials include spandex, Lycra, nylon, or similar elastic materials.

Referring to FIG. 3, preferably a bag or pouch 40 is provided for housing cover 10' when it is not in use. Bag or pouch 40 is preferably made of a mesh material for breathability and is provided with a zipper 41. A coordinating lightweight yoga strap 42 may also be provided with the cover 10' and bag 40, that is antibacterial and machine washable as well. Cover 10' can be washed in the zippered mesh bag 40 for protection and to prevent loss during laundering. A strap 42 may be provided for ease in carrying bag 40.

Referring to FIGS. 4a-4b, there is shown another embodiment of the stretchable cover wherein the material used to form the cover includes anti-slip or frictional surface elements integrated therein. FIG. 4a shows the cover when not in use; FIG. 4b shows the cover stretched to accommodate and house a yoga block. In the embodiment shown, cover 110' has a first wall 111, a second wall 112, two side walls 113 and two end walls 114 arranged to form an interior cavity 115. Interior cavity 115 includes an opening 116 through which an exercise block or yoga block 130 is appointed to traverse for receiving and temporarily housing yoga block 130 within cavity 115. Opening 116 is located on a first wall 111 and is formed as a slit or stretchable opening expanding to engulf yoga block 130 when the block is being inserted, and contracting in a closed configuration when yoga block 130 is housed within the interior cavity 130. Cover 110' includes anti-slip surface 120' integrated within first wall 111, second wall 112, the two side walls 113 and the two end walls 114 so that the entire cover 110' is substantially covered with the anti-slip surface. Anti-slip surface 120' is preferably composed as a plurality of up-raised structures composed of a friction inducing material, such as rubber, a polymeric material, a silicon, or other frictional substance so that the cover 110' with block 130 therein does not slide on smooth surfaces, such as hardwood or laminate floors. Cover 110' is a compact cover that stretches to cover a yoga block providing sanitary, aesthetic, comfort, sweat absorption and anti-slip functions, protecting a user from germs, bacteria, sweat and viruses. A strap 142 may be provided for ease in cover 110'.

Referring to FIG. 5 there is illustrated another embodiment of the cover wherein the cover is disposable and includes a tab covering an adhesive. Disposable cover 210' has a first wall 211, a second wall 212, two side walls 213 and two end walls 214 arranged to form an interior cavity 215 with an opening 216 for receiving a yoga block. Opening 216 is located on an end wall 214 and is formed as an aperture with an elongated portion 217 that includes an adhesive strip 218 with a peel tab 219 thereon. When in use, a yoga block is inserted within opening 216 into cavity 215. After the block is inserted within the cavity 215, peel tab 219 is peeled from adhesive strip 218 to expose an adhesive surface, and the adhesive surface of elongated portion 217 is adhered to a local area 211' of first wall 211. After use, the cover can readily be torn from or removed from the yoga block and discarded. Preferably, the cover 210' is composed of a paper fiber and includes anti-slip frictional elements 220' thereon, such as rubber, silicone, or polymeric frictional materials.

Referring to FIG. 6, there is illustrated another embodiment of the stretchable cover wherein the cover opening is located on an end wall and the opening includes an elastic band therein. Cover 310' has a first wall 311, a second wall 312, two side walls 313 and two end walls 314 arranged to form an interior cavity 315 with an opening 316 for receiving a yoga block 330. Opening 316 is located on an end wall 314 and is formed as an aperture with an elastic band 317 therein. When in use, a yoga block is inserted within opening 316 into cavity 315. After the block is inserted within the cavity 315, elastic band 317 contracts to mostly close, so that the block 330 is substantially closed and housed within cavity 315.

Referring to FIG. 7, there is shown an embodiment of the stretchable cover applied to form a mat with yoga blocks placed therein. The mat construction is similar to that discussed hereinabove regarding FIGS. 1a-1e. Cover 410' has a first wall 411, a second wall 412, two side walls 413 and two end walls 414 arranged to form an interior cavity 415 with an opening 416 for receiving a plurality of yoga blocks 430. When in use, yoga blocks 430 are inserted within opening 416 into cavity 415 and placed at each corner, as shown. Cover 410' includes at least one anti-slip surface integrated within first wall 411, second wall 412, the two side walls 413 or the two end walls 414. Herein, an anti-slip surface is integrated within first wall 411, shown as a plurality of dots 420'. Dots 420' are preferably composed as small up-raised dot structures composed of a friction inducing material, such as rubber, a polymeric material, a silicon, or other frictional substance so that the cover 410' with block 430 therein does not slide on smooth surfaces, such as hardwood or laminate floors.

The subject stretchable cover provides a compact cover that is stretchable to cover a yoga block for sanitary, aesthetic, comfort, sweat absorption and anti-slip purposes. For sanitary purposes, the stretchable cover protects the user from germs, bacteria, sweat and viruses that would otherwise be present on a used yoga block. Machine washing ability allows the stretchable cover to be utilized and regularly washed to create and maintain a fresh, clean surface. In one embodiment the stretchable cover is preferably composed of an antimicrobial/antibacterial material with copper or silver threading to ensure antimicrobial properties even at seams of the cover. In another embodiment, the stretchable cover includes an anti-slip surface. For example, the anti-slip surface can comprise at least a portion of an exterior surface having rubber, polymeric, silicon, or other friction material portions—preferably arranged as a plurality of dots—to provide an anti-slip surface and/grip surface on the cover. The stretchable cover is composed of a thin, stretchy, soft material so that it can be stretched to snuggly fit and cover yoga blocks having a variety of sizes and shapes. To enhance environmental aspects, in another embodiment, the stretchable cover is made from recycled materials. Materials utilized to make the stretchable cover have significant elasticity so that when being carried or otherwise not in use, it is a small non-cumbersome cover; conversely, owing to the significant elasticity of the cover, it can be stretched to cover and accommodate all standard yoga block sizes. These materials include spandex, Lycra, or similar elastic materials. Unique designs and patterns can be utilized on the cover, including encouraging words, such as inhale, exhale, breathe, release, stretch, namaste, ohm, shanti, and/or pictures of mala beads, lotus and Buddha etc. In another embodiment, the stretchable cover includes a small, thin, bag that is machine washable. Preferably, the bag or pouch is made of a mesh material for breathability and is provided with a zipper and a coordinating lightweight yoga strap that is antibacterial and machine washable as well. Accordingly, the subject stretchable cover and strap can be washed in the zippered mesh bag for protection and to prevent loss.

Figure 8A:
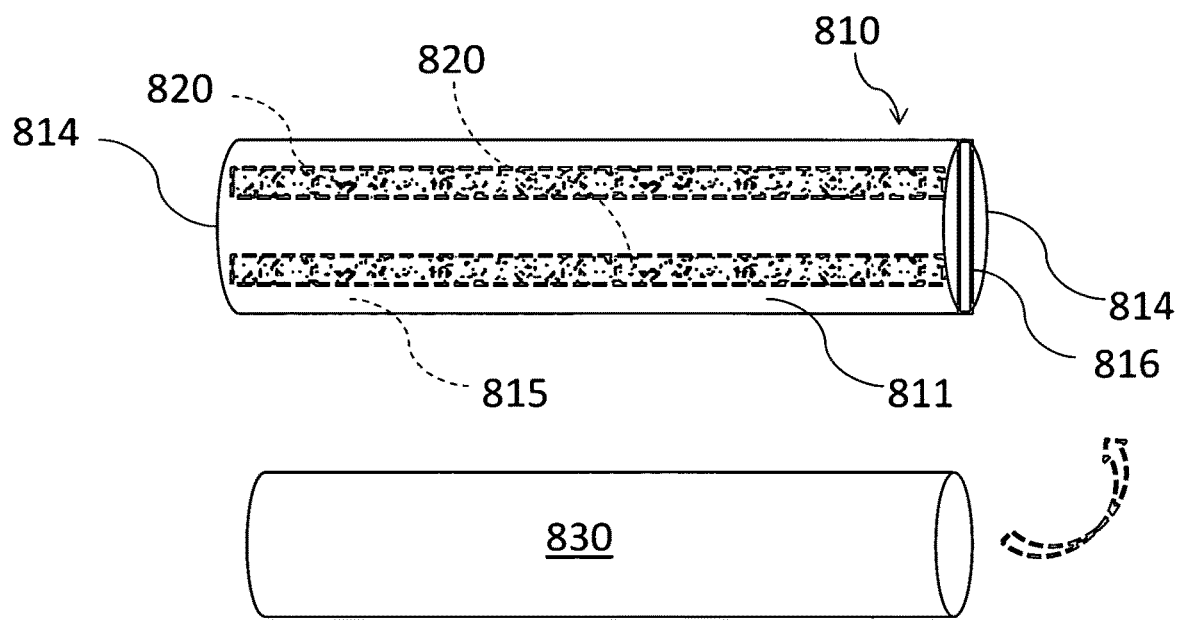
FIG. 8a shows a top plan view another embodiment of the cover, wherein the cover is formed as an elongated tube sleeve and the exercise equipment is a foam roller.
Figure 8B:
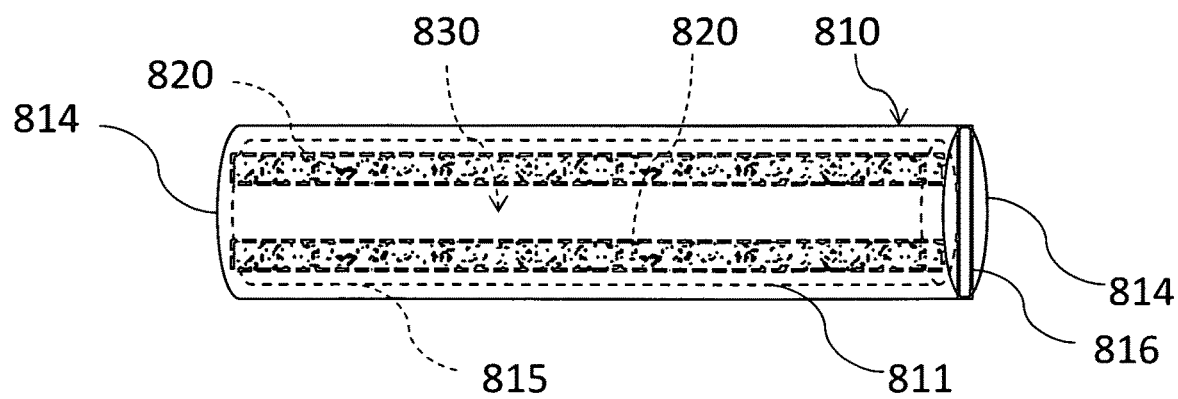
FIG. 8b shows the cover of FIG. 8a stretched to accommodate and house a foam roller.

FIGS. 8a and 8b illustrate an embodiment of the cover wherein the cover is formed as an elongated tube sleeve and the exercise equipment is a foam roller. FIG. 8a shows a top plan view prior to insertion of a foam roller; FIG. 8b shows the cover of FIG. 8a stretched to accommodate and house the foam roller. In the embodiment shown, cover 810 is formed as an elongated tube sleeve having a tube wall 811 and two end walls 814 arranged to form an interior cavity 815. Interior cavity 815 includes an opening 816 through which a foam roller 830 is appointed to traverse for receiving and temporarily housing foam roller 830 within cavity 815. Opening 816 is preferably located on one of the end walls 814 and is formed as a slit or stretchable opening expanding to engulf roller 830 when it is being inserted, and contracting in a closed configuration when roller 830 is housed within the interior cavity 815.

Preferably, cover 810 includes at least one anti-slip surface 820 integrated within the wall 811. Preferably, in this embodiment the anti-slip surface 820 is integrated within the interior 815 of the wall 811 so that the foam roller 830 does not slip or slid around within the cover 810 when the roller 830 is being used. Conversely, preferably the exterior surface of cover 810 is smooth for ease in rolling and using. In the embodiment shown, anti-slip surface 820 is a frictional segment of material or material having a frictional coating thereon. Cover 810 is a compact cover that stretches to cover a foam roller providing sanitary, aesthetic, comfort, sweat absorption and protects a user from germs, bacteria, sweat and viruses. It is machine washable, and is preferably composed of an antimicrobial/antibacterial material with copper or silver threading to ensure antimicrobial properties even at seams of the cover. Antimicrobial textile treatment that durably binds effective antimicrobial ingredients to textiles that inhibit the growth of bacteria on and in the fabric may be utilized in making the cover 810. In an alternative embodiment, an absorptive cloth layer may be provided, such as cotton, or terry cloth.

Figure 9A:
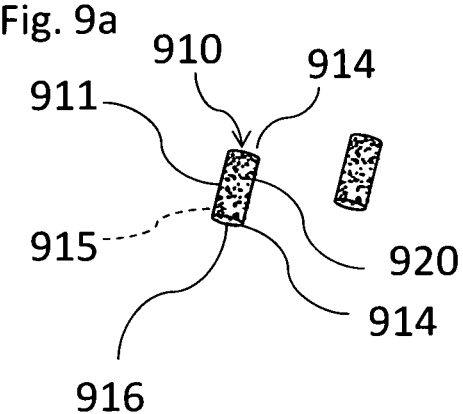
FIG. 9a shows a top plan view of another embodiment of the cover, wherein the cover is formed as a truncated tube sleeve and the exercise equipment is a handle of arm components of an exercise machine.
Figure 9B:
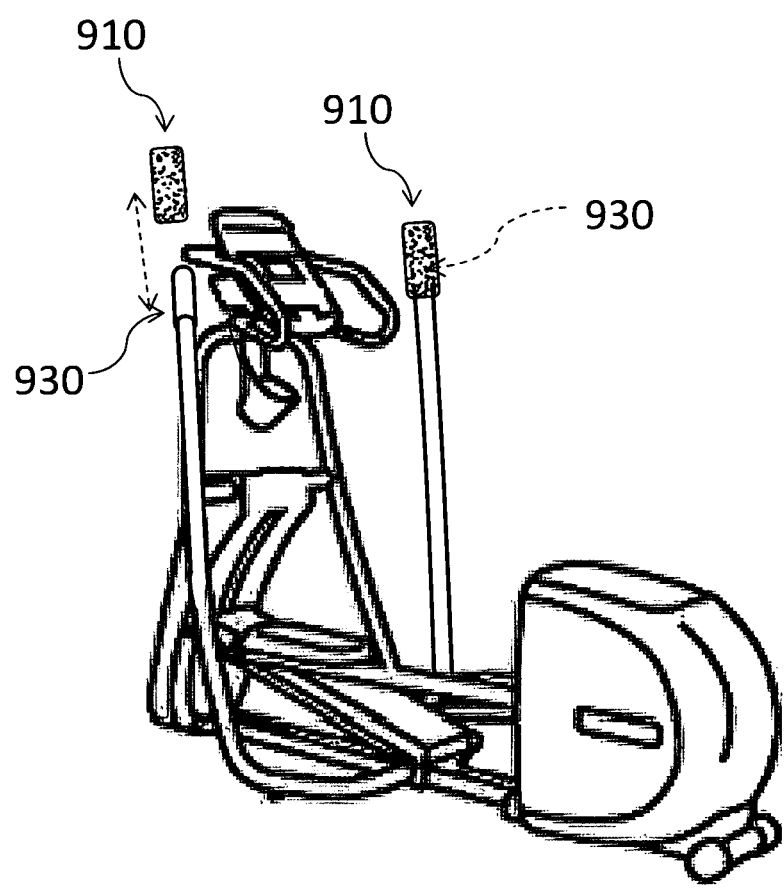
FIG. 9b shows the cover of FIG. 9a stretched to accommodate and house the handles of arm components of an exercise machine.

FIG. 9a shows a top plan of another embodiment of the cover, wherein the cover is formed as a truncated tube sleeve and the exercise equipment is a handle of arm components of an exercise machine. FIG. 9b shows the cover of FIG. 9a stretched to accommodate and house the handles of arm components of an exercise machine. In the embodiment shown, cover 910 is formed as a truncated tube sleeve having a tube wall 911 and two end walls 914 arranged to form an interior cavity 915. Interior cavity 915 includes an opening 916 through which a handle 930 is appointed to traverse for receiving and temporarily housing handle 930 within cavity 915. Opening 916 is preferably located on one of the end walls 914 and is formed as a slit or stretchable opening expanding to engulf handle 930 when it is being inserted, and contracting in a closed configuration when handle 930 is housed within the interior cavity 915.

Preferably, cover 910 includes at least one anti-slip surface 920 integrated within the wall 911. Preferably, in this embodiment the anti-slip surface 920 is integrated on the exterior surface of wall 911 so that the user's hands feel comfortable on cover 910 when grasping handle 930. Cover 910 is a compact cover that stretches to cover handle 930 providing sanitary, aesthetic, comfort, sweat absorption and protects a user from germs, bacteria, sweat and viruses. It is machine washable, and is preferably composed of an antimicrobial/antibacterial material with copper or silver threading to ensure antimicrobial properties even at seams of the cover. Antimicrobial textile treatment that durably binds effective antimicrobial ingredients to textiles that inhibit the growth of bacteria on and in the fabric may be utilized in making the cover 910. In an alternative embodiment, an absorptive cloth layer may be provided to combat sweaty hands, such as cotton, or terry cloth.

Figure 10A:
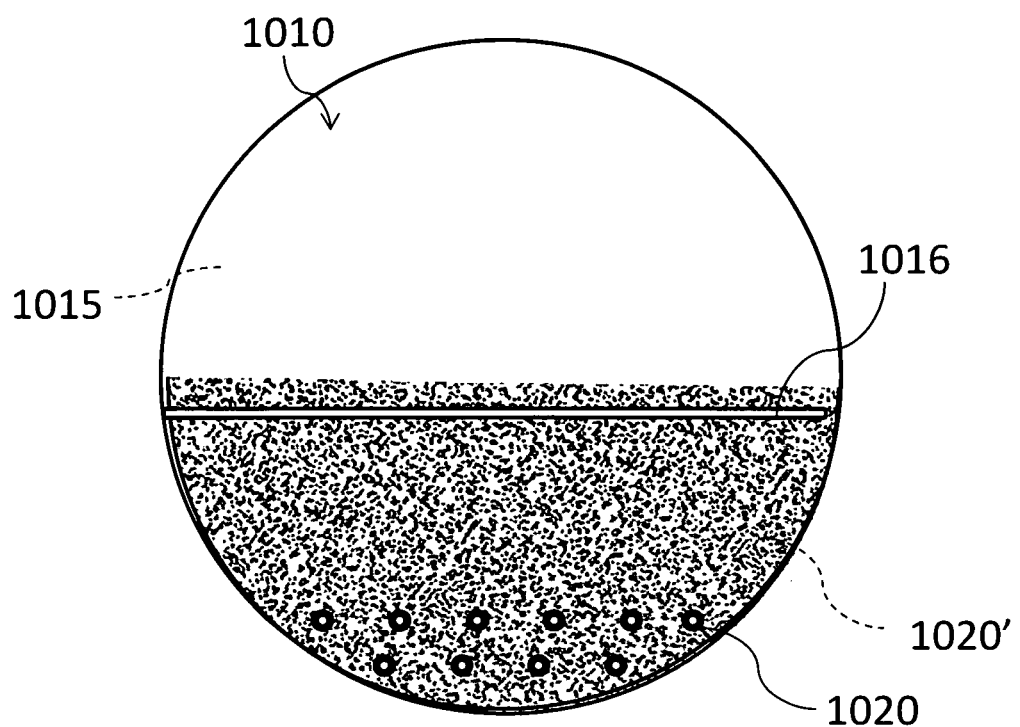
FIG. 10a shows a top plan view of another embodiment of the cover, wherein the cover is formed as a circle and the exercise equipment is an exercise ball.
Figure 10B:
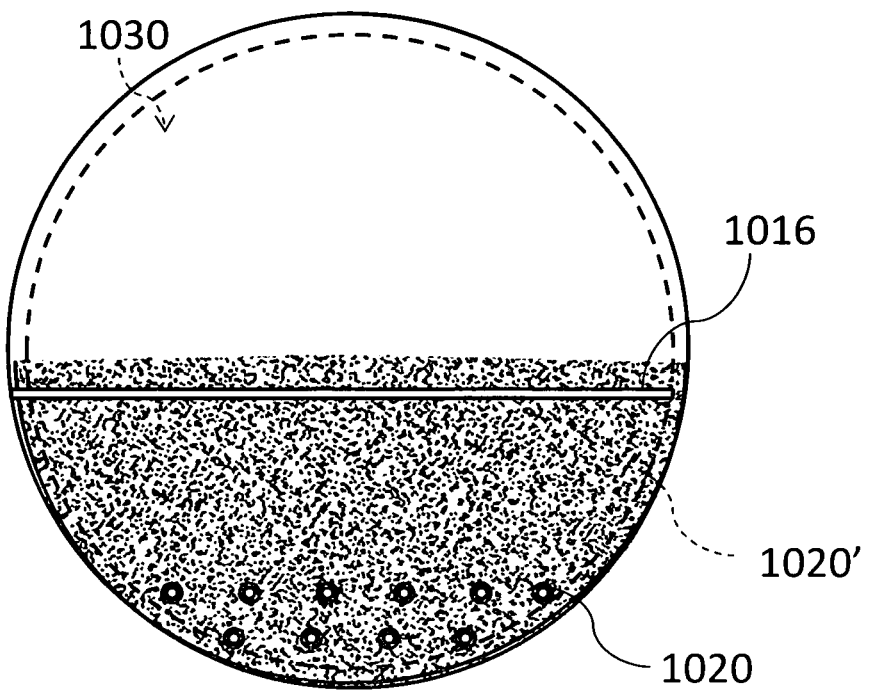
FIG. 10b shows the cover of FIG. 10a stretched to accommodate and house an exercise ball.

FIG. 10a shows another embodiment of the cover, wherein the cover is formed as a circle and the exercise equipment is an exercise ball. FIG. 10b shows the cover of FIG. 10a stretched to accommodate and house exercise ball. In the embodiment shown, cover 1010 is formed as a circular or spherical cover formed with an interior cavity 1015. Interior cavity 1015 includes an opening 1016 through which an exercise ball 1030 is appointed to traverse for receiving and temporarily housing exercise ball 1030 within cavity 1015. Opening 1016 is preferably formed as a slit or stretchable opening expanding to exercise ball 1030 when it is being inserted, and contracting in a closed configuration when exercise ball 1030 is housed within the interior cavity 1015. Preferably, cover 1010 includes at least one anti-slip surface 1020 on the exterior; and another anti-slip surface 1020' on the interior. Preferably, in this embodiment the anti-slip surface 1020, 1020' is integrated on the exterior surface as well as on the interior surface of cover 1010 to prevent the ball 1030 from slipping or shifting within the cover 1010 and prevent the cover 1010 and ball 1030 from sliding or slipping on a floor surface.

The foregoing descriptions of specific embodiments of the present disclosure have been presented for purposes of illustration and description. Each of the covers set forth can be modified in size, color and material without departing from the scope of the invention. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure, and various embodiments with various modifications as are suited to the particular use contemplated. These embodiments, as well as the modifications and variations thereof, are intended to fall within the scope of the invention, as defined by the subjoined claims.

What is claimed is:

1. A removable exercise block cover, consisting of:
    a. a form-fitting cover composed of an elastic material comprising polyether polyurea copolymer, where the elastic material can be stretched to form-fit and cover an exercise block, and where said cover is formed as a single and continuous rectangular prism having a first wall, a second wall, two side walls, and two end walls arranged to form an interior cavity, said first wall and said second wall each having a larger surface area than each of said two side walls and said two end walls;
    b. said interior cavity including an opening through which said exercise block is to traverse, said opening being dimensioned for receiving and temporarily housing said exercise block within said interior cavity;
    c. said opening consisting of a stretchable slit that consists of an elongated narrow cut or opening in the elastic material with parallel, non-overlapping slit walls located on said first wall and extending between, abutting and terminating at said two side walls; the opening being dimensioned to expand to engulf said exercise block when being inserted, and contract in a closed configuration when said exercise block is housed within said interior cavity, wherein said opening closes over said exercise block such that it is substantially enclosed within said cover;

d. an anti-slip surface located on exterior facing surfaces of said first wall and said second wall, wherein said two side walls, said two end walls, and interior surfaces of said first wall and said second wall are planar and do not include said anti-slip surface;
e. said anti-slip surface consisting of a plurality of protruding dot structures formed from a friction inducing material selected from the group consisting of rubber, a polymeric material, and silicone.

2. The removable exercise block cover as recited in claim 1, wherein said cover includes antimicrobial and/or antibacterial properties.

3. The removable exercise block cover as recited in claim 1, wherein at least one wall includes an absorptive cloth layer to absorb sweat.

4. An exercise block system, comprising: the removable exercise block cover recited in claim 1, and at least one of an exercise block and a mesh bag for housing and carrying said removable cover.

* * * * *